April 21, 1964     O. R. HUGGINS     3,129,917
SUPPORT FOR AN AERIAL CABLE SUSPENSION CLAMP
Original Filed Aug. 4, 1960     3 Sheets-Sheet 1
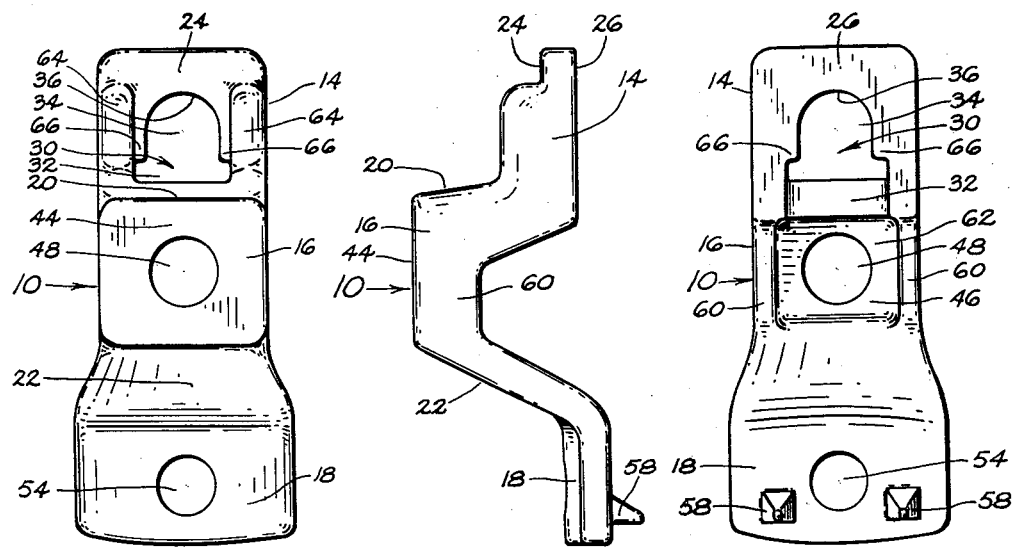
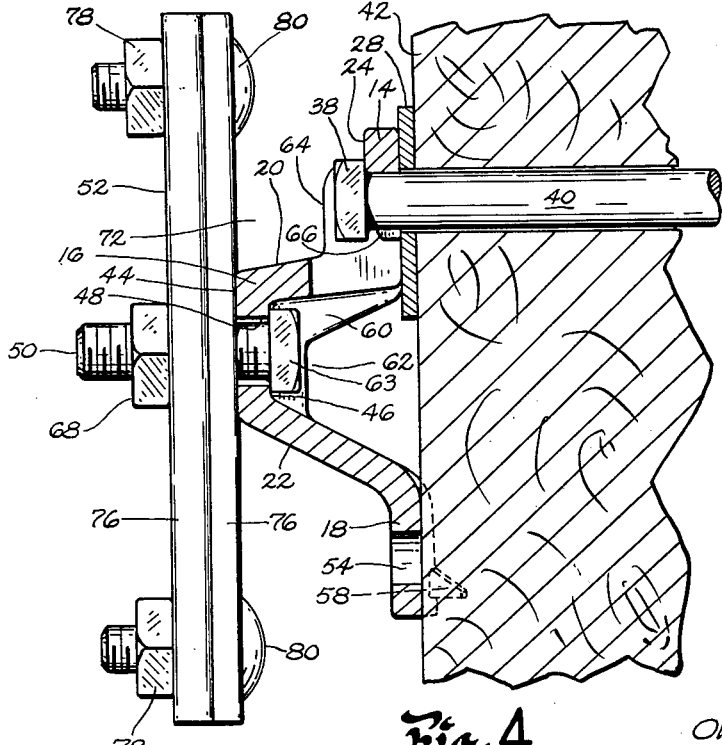
INVENTOR.
OWEN R. HUGGINS
BY
Steward & Steward
his Attorneys

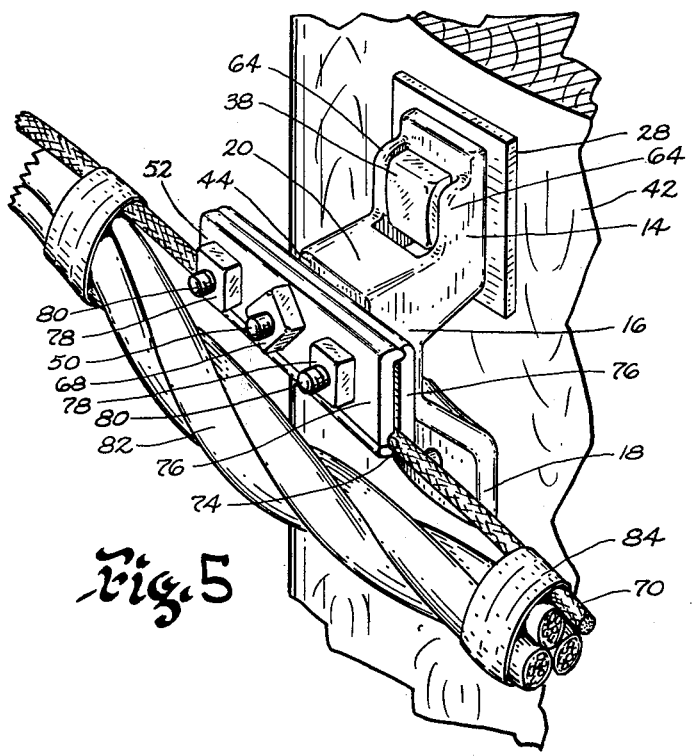
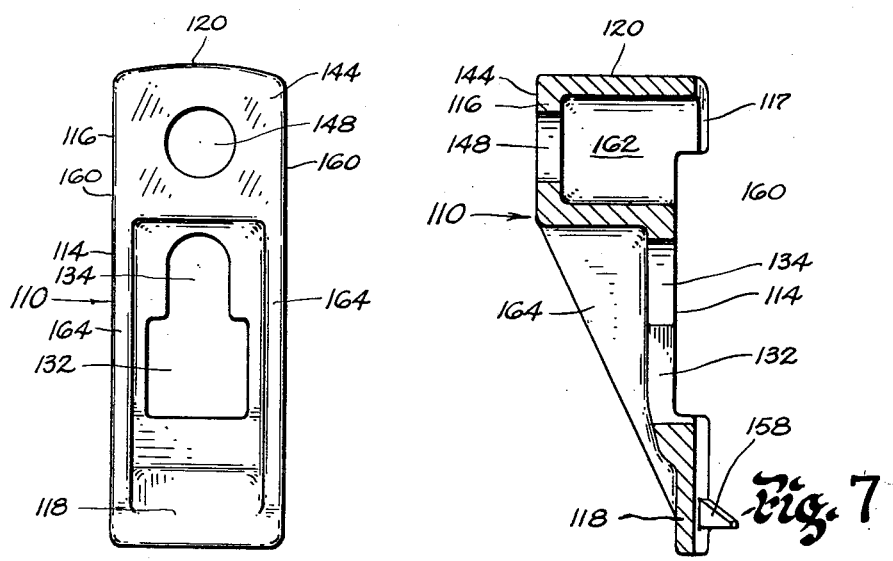

April 21, 1964     O. R. HUGGINS     3,129,917

SUPPORT FOR AN AERIAL CABLE SUSPENSION CLAMP

Original Filed Aug. 4, 1960     3 Sheets-Sheet 3

INVENTOR.
OWEN R. HUGGINS
BY
Steward & Steward
his Attorneys

United States Patent Office 3,129,917
Patented Apr. 21, 1964

3,129,917
SUPPORT FOR AN AERIAL CABLE
SUSPENSION CLAMP
Owen R. Huggins, New Canaan, Conn., assignor to Malleable Iron Fittings Company, Branford, Conn., a corporation of Connecticut
Continuation of application Ser. No. 47,448, Aug. 4, 1960.
This application Nov. 27, 1962, Ser. No. 243,698
1 Claim. (Cl. 248—221)

This application is a continuation of applicant's copending application Ser. No. 47,448, filed August 4, 1960, now abandoned.

This invention relates generally to utility pole hardware, that is, to fastening devices for securing cables, guy wires and the like to utility poles. Specifically, the invention relates to devices for attaching aerial cable suspension clamps to utility poles. While the applicant's invention is especially adapted for use in attaching an aerial cable suspension clamp to a utility pole to which an existing cable has already been secured, it is not limited solely to such applications but may also be used to attach an aerial cable suspension clamp to a utility pole as a new installation.

Aerial cables, such as those customarily used by power and telephone companies, are generally strung above ground on utility poles. The power or communications cable itself is generally rather large in diameter and the length of cable used between adjacent poles is such that the dead weight of the cable to be supported is quite substantial. In addition, the cables are exposed to the elements and by reason of this fact are quite frequently subjected to the severe stresses of high winds and ice storms. Because of these and other considerations, it is absolutely necessary that the cable be securely fastened at each of the utility poles.

Inasmuch as the core of the power or communication cable usually comprises relatively soft copper wire it is not feasible to secure the aerial cable directly to the utility poles since the wires in the cable are not strong enough to withstand the load stresses which would be imposed on the cable. Accordingly, the aerial cable is supported by attaching it to a small but strong galvanized steel messenger strand that is strung on the poles by means of aerial cable suspension clamps.

The most widely used type of aerial cable suspension clamp comprises a pair of elongated rectangular plates the inner surfaces of which are shaped so as to form an internal longitudinally extending horizontal groove. The clamp is provided with tightening means in the form of a pair of bolts and nuts by means of which the two plates of the clamp may be forced together to tightly grip the messenger strand after it is placed in the groove. In addition, the clamp is provided with a suitable opening to receive another bolt and nut by means of which the clamp may be attached to the utility pole.

In new installations, that is, where a cable is being strung on a series of utility poles for the first time, the aerial cable suspension clamps are secured to the poles by first drilling a hole completely through each pole, inserting a long through-bolt in the hole and then mounting the clamp on the end of the through-bolt. In order to space the clamp a sufficient distance from the pole to avoid rubbing between the cable and the pole, the clamp is mounted with a pair of spacing nuts between it and the pole. Since this spacing results in a substantial bending moment on the through-bolt a metal strap is secured at the end of the through-bolt and fixed to the pole at a point above the bolt by means of a lag screw so as to counteract this bending moment. A tightening nut is provided outwardly of the strap by means of which the entire assembly can be held together.

Where a series of utility poles are shared by more than one power or communications company it is necessary that cable be strung on both sides of the poles. In such cases it has, heretofore, been customary practice for a lineman to climb each pole, unfasten the messenger strand and cable, completely remove the strap and clamp assembly from the through-bolt and then exchange the through-bolt for one threaded at both ends. After inserting the double ended bolt in the hole in the pole two sets of aerial suspension cable clamps, supporting straps, and spacing and tightening nuts are mounted on the bolt, one set at each end, in the same manner as before. With the clamps in place at both sides of the pole the existing cable and the new cable are then raised and inserted in the clamps.

It will be readily appreciated that the above described procedure is costly and time consuming. The procedure actually amounts to the removal and restringing of an already strung cable in addition to the stringing of a new cable. When it is remembered that this procedure must be carried out for each of a very large number of poles it will be seen that the waste in time and money is very great.

Accordingly, the general object of the present invention is to effect substantial savings in both time and money by providing a fastening device which will permit the ready installation of a second cable on a series of shared utility poles without requiring that the already existing cable be removed.

More specifically, it is an object of the invention to provide a cable clamp support so adapted that it can be secured to the through-bolt of an existing cable clamp assembly and without necessitating the removal of the through-bolt. Another object of the invention is to provide a cable clamp support which will have a laterally disposed smoothly-contoured surface adapted to receive the messenger strand of the cable prior to its being placed under tension. Another object of the invention is to provide a cable clamp support that will be capable of resisting vertical displacement relative to the utility pole and one which will have adequate resistance to horizontal pull-out. A further object of the invention is to provide a cable clamp support so adapted that the fastening means securing the support to the pole and the clamping means securing the cable clamp to the clamp support can both be tightened with a single wrench. A still further object of the invention is to provide a cable clamp support with means for locking the support to the pole to prevent upward vertical dislodgment therefrom.

The achievement of the foregoing objectives is made possible by the present invention which comprises a cable clamp support of novel construction. Briefly, and in general, applicant's cable clamp support comprises a generally rectangular, non-planar member having upper and lower rearward portions that serve as bearing pads for the member and a forward portion, laterally and forwardly spaced relative to said bearing pads, that serves as a spacer body. Preferably, the clamp support comprises a single integral metal casting although this is not essential to the invention. The upper rearward portion or bearing pad is formed with an opening therein so shaped as to define an enlarged aperture with a narrower elongated slot at the upper side of the aperture whereby the cable clamp support may be slidably dropped over the head end of a through-bolt horizontally disposed on the utility pole and securely fastened thereto upon the tightening of the bolt. The forward or spacer body portion of the cable clamp support is provided with a substantially vertically disposed outer surface or face that is laterally spaced from the rearward bearing portions and this outer surface serves to locate the aerial cable suspension clamp, and hence the cable, a sufficient distance from the pole as to prevent the cable from coming into rubbing contact therewith. An opening is formed adjacent the center of the outer surface of the spacer body portion, to receive the clamping bolt for the aerial cable suspension clamp. Upon the tightening of the holding nut on the clamping bolt the clamp is brought into engagement with the outer surface or face of the spacer body portion and securely joined to the support. A substantially horizontally disposed smooth surface extends laterally between the rearward and forward portions of the clamp above the axis of the clamping bolt and serves as a temporary support for the messenger strand of the aerial cable before the strand is inserted in the cable clamp. Laterally extending side walls are disposed immediately adjacent the openings for the through-bolt and clamping bolt and are so spaced as to prevent rotation of the bolts so that only one wrench need be used to tighten the through-bolt and the clamping bolt.

The lower rearward or bearing pad portion of the clamp support is adapted to engage the pole below the axis of the through-bolt and is provided with means for resisting vertical displacement of the support with respect to the utility pole. As shown in the drawings, these means may comprise one or more pointed spurs that are driven into the utility pole when the support is mounted thereon. Additional locking means for preventing dislodgment of the bracket from the through bolt in the utility pole may be provided whenever desired. The additional locking means are adapted to be mounted on the clamping bolt for the cable clamp and are adapted to bear against the vertically disposed surface of the forward or spacer body portion of the clamp support and to extend underneath the head end of the through-bolt, thereby preventing relative movement of the bracket with respect to the through-bolt.

Reference will now be had to the accompanying drawings wherein certain presently preferred embodiments of the invention are shown for the purpose of illustrating the invention, and wherein:

FIG. 1 is a front elevational view of a cable clamp support constructed in accordance with the teachings of the invention;

FIG. 2 is a side elevational view of the cable clamp support shown in FIG. 1;

FIG. 3 is a rear elevational view of the cable clamp support shown in FIG. 1;

FIG. 4 is a vertical sectional view through the cable clamp support shown in FIGS. 1-3 illustrating the manner of securing the support to a utility pole and showing the aerial cable suspension clamp turned so as to form a trough for the messenger strand;

FIG. 5 is a perspective view showing the completed installation;

FIG. 6 is a front elevational views of another cable clamp support constructed in accordance with the teachings of the invention;

FIG. 7 is a vertical sectional view taken through the center line of the support shown in FIG. 6;

Figure 8:
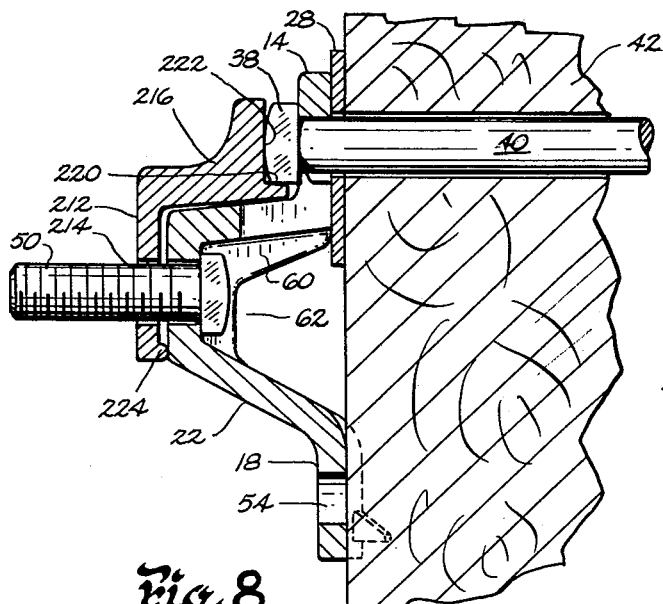
FIG. 8 is a vertical sectional view through the cable clamp support shown in FIGS. 1-3 illustrating the manner of applying a locking plate to the support.

Referring first to FIGS. 1-5, there is shown a generally rectangular, non-planar cable clamp support 10. As shown, the cable clamp support 10 is formed as an integral casting, this means of fabricating the support being preferred for reasons of strength and economy, although the support may be fabricated in other suitable ways and may comprise a plurality of parts, if so desired. Inasmuch as the support 10 is adapted in use to be disposed substantially vertically at the side of a utility pole it will be described hereinafter with reference to that position.

The support 10 comprises an upper rearward or bearing pad portion 14, a central forward or spacer body portion 16 and a lower rearward or bearing pad portion 18. Upper and lower laterally extending surfaces 20, 22 respectively, serve to join the forward or spacer body portion 16 to the two bearing pad portions 14 and 18. The front and back surfaces 24, 26 respectively, of the upper bearing pad portion 14 of the support 10 are disposed so as to be substantially vertical and the back surface 26 is preferably made planar for surface to surface engagement with a square washer 28 (FIG. 4) as will be described hereinafter. An opening 30 is formed in the front and back surfaces 24, 26 of the upper bearing pad 14 of the support and is so shaped as to form an enlarged, substantially square aperture 32 that starts at the lower edge of the bearing pad 14 and extends upwardly into the front and back surfaces 24, 26. The aperture 32 has a narrower elongated slot 34 formed at its upper edge, the terminal portion 36 of which is semi-circular in shape. The dimensions of the aperture 32 and the elongated slot 34 are selected so as to make the aperture slightly larger than the head 38 of the through-bolt 40 on the utility pole 42 (FIG. 4) and the slot 34 slightly larger than the body of the through-bolt 40 but less than the head 38 of the bolt so that the aperture of the support may fit over the head end of the bolt and the elongated slot may engage the body of the bolt when the support is dropped over the bolt. Tightening of the through-bolt then draws the head of the bolt inwardly against the front surface 24 of the bearing pad 14, thus, tightly wedging it between the bolt 38 and the square washer 28 and securely fastening the support to the pole.

The central or spacer body portion 16 of the support 10 is laterally disposed from the upper bearing pad portion 14 and is provided with substantially vertically disposed inner and outer surfaces 44, 46 respectively. A circular opening 48 is formed centrally of said forward portion 16 through said surfaces 44, 46 to enable the spacer body portion to receive a clamping bolt 50 that serves to attach the aerial cable suspension clamp 52 to the support 10. The upper laterally extending surface 20 is substantially horizontally disposed and joins the upper end of the spacer body portion 16 to the lower end of the upper bearing pad 14. The bottom edge of the spacer body portion 16 is joined to the lower bearing pad 18 of the support by the lower inclined laterally extending surface 22. Unlike the upper bearing pad 14, which is substantially planar, the lower rearward or bearing pad portion 18 of the support 10, is arcuately shaped so as to correspond to the outer circumference of the utility pole 42. In the form of the invention shown in FIGS. 1-3 the lower bearing pad 18 has a somewhat greater width than the spacer body or upper bearing pad portion 16 of the support in order to provide a greater bearing area against the pole. However, this is not essential, it being only necessary to provide sufficient area to prevent the surface stress on the pole from exceeding desired limits. A circular opening 54 is also provided in this portion 18 of the support 10 to enable it to be fastened to the pole 42 with a lag screw (not shown), if necessary. Means are also provided for resisting vertical dislodgment of the support relative to the utility pole. As shown, these means comprise a pair of pointed spurs 58 that are adapted to be driven into the pole at the time of installation so as to anchor the support 10 relative thereto. Since the lower bearing pad 18 engages the outer surface of the utility pole 42 it extends inwardly farther than the upper bearing pad 14 which engages the square washer 28 on the through-bolt 40, the extent of the difference being equal to the thickness of the washer.

The support 10 is provided with laterally extending side portions adjacent the openings in the upper bearing pad and in the spacer body portion. In the case of the spacer body portion these laterally extending sides take the form of inwardly extending webs 60, 60 which, in conjunction with the upper and lower laterally extending surfaces 20, 22 serve to define an interior, and outwardly extending, recess 62 large enough to receive the head end 63 of the clamping bolt 50 for the cable clamp 52 but not lage enough to permit rotation of the bolt. In the case of the upper rearward bearing pad portion the laterally extending sides take the form of a pair of parallel, vertically disposed guard walls 64, 64 at the sides of the aperture and slot. For reasons to be explained hereinafter, all exposed edges of the guard walls are rounded off so as to present no exposed sharp edges.

The manner of mounting the clamp support on a utility pole having an existing cable installation is best shown in FIGS. 4 and 5. Unlike the former practice described heretofore, it is not necessary to remove the through-bolt 40 in the utility pole 42 in order to mount a second cable when the applicant's clamp support is employed. In installing the clamp support of the present invention it is only necessary to back off the holding nut (not shown) on the through-bolt 40 a sufficient distance to permit the through-bolt to be driven approximately a quarter of an inch away from the side of the utility pole 42 as is best shown in FIG. 4. After the through-bolt is so extended, the clamp support 10 is dropped over the head end of the bolt 40 by first passing the enlarged aperture 32 inwardly of the bolt head 38 and then lowering the clamp support 10 until the upper surface 36 of the elongated slot 34 engages the body or shank of the through-bolt in the pole. The clamp support then lies between the head end 38 of the bolt 40 and the square washer 28 and the planar back surface 26 of the upper bearing pad 14 engages the planar surface of the washer 28. In order to facilitate insertion of the upper bearing pad portion 14 of the support between the washer and the head end of the through-bolt, the lower edges 66, 66 of the upper bearing pad portion 14 at the sides of the elongated slot are tapered so that the thickness of the bearing pad is at a minimum at the bottom of the elongated slot 34 where it meets the upper edge of the aperture 32.

Tightening of the holding nut on the through-bolt 40 draws the head end 38 of the bolt inwardly against the front surface 24 of the upper bearing pad 14 and forces the back surface 26 tightly against the washer 28 thereby securely fastening the clamp support 10 to the pole. In this tightened condition the head end 38 of the bolt 40 is positioned so as to lie between the parallel guard walls 64, 64 where, by reason of the spacing therebetween, the head end of the through-bolt is prevented from turning. The through-bolt can, therefore, be tightened by using a single wrench on the holding nut at the opposite end of the through-bolt. One hand of the lineman making the installation is thereby freed for other functions and need not be used to hold a wrench on the head end of the through-bolt as required by the usual practice heretofore followed. Once the support 10 has been inserted over the head end 38 of the through-bolt 40 in the utility pole and the holding nut for the bolt tightened, the lower bearing pad 18 is hammered against the pole until the spurs 58, 58 formed on the inner surface thereof are firmly driven into the pole 42.

Prior to the insertion of the cable clamp support on the through-bolt, the clamping bolt 50 is inserted into the interior recess 62 formed in the spacer body 16 and extends outwardly through the opening in the spacer body portion of the clamp. The aerial cable suspension clamp 52 together with a holding nut 68 are mounted on the clamping bolt 50 so that when the clamp support is dropped over the through-bolt and the through-bolt is tightened, all is in readiness for the mounting of the cable in the aerial cable suspension clamp.

The aerial cable is strung by first running off from a drum (not shown) a sufficient length of the galvanized steel messenger strand 70 to extend between several poles. Several linemen then take the galvanized messenger strand up the poles and lay the strand across the upper laterally extending surface 20 of the clamp supports, the linemen having previously rotated each cable clamp 52 (FIG. 4) through 90° to a vertical position when installing the clamp supports so that, in conjunction with the adjacent clamp support, a U-shaped trough 72 is formed which serves to retain the messenger strand on the poles. While thus retained on the poles, the messenger strand is brought up to a tension of approximately 3,600 pounds per square inch. Thereafter, the aerial cable suspension clamps on the poles are rotated to their horizontal positions and the messenger strand 70 is positioned in the groove 74 formed between the jaws 76, 76 of each clamp. The clamps 52 are then tightened by means of the nuts 78, 78 on the screws 80, 80 so as to firmly grip the messenger strand between the jaws and the holding nuts 68 are tightened so as to securely fasten the clamps to the clamp supports. The cable 82 itself is then raised on the poles by means of pulleys (not shown), brought up to suitable tension and lashed to the messenger strand by means of a spinning device which travels between the poles and wraps a binder 84 around both the cable 82 and the messenger strand 70. In this manner the second cable is secured to the poles.

By reason of the fact that the applicant's clamp support 10 does not require that it be threadedly fastened to the existing through-bolt 40 on the utility pole 42, it is possible to string the second cable to a series of utility poles on which a prior cable has been strung without having to remove and restring the prior cable, a step, which heretofore, had always been necessary. The provision of a clamp support so adapted as to slip in one direction over the head end of the through-bolt and one provided with means for resisting dislodgment in the one possible direction, greatly facilitates the installation of the second cable and reduces costs without sacrificing security. Because applicant's support provides against vertical dislodgment relative to the pole it may be used on poles located in valleys and in locations subject to high winds. In such situations the forces on the cable may actually be acting upwardly, yet applicant's clamp support will not become dislodged. The spacer body 16 of applicant's clamp support serves to provide the proper clearance between the cable and the pole to prevent rubbing therebetween and the upper lateral surface 20 of the support provides a smooth-contoured runway for the messenger strand 70. Because of this, and also because of the rounded edges of the guard walls 64, 64 adjacent the opening 30, the galvanized messenger strand can be pulled up to tension without scraping any of the galvanized coating from the strand. Additionally, the provision of the guard walls 64, 64 and the laterally extending side walls 60, 60 of the recess serve to hold the heads of the clamping bolt and through-bolt against rotation so as to permit these bolts to be tightened with a single wrench. The lower bearing pad 18 of the support serves to resist the bending moment imposed on the through-bolt by the downwardly acting force on the cable and avoids the necessity of utilizing the steel strap previously employed. Where the clamp support is used at a corner and there is a substantial horizontal force tending to pull the support off the pole, a lag screw may be used in the hole 54 in the lower bearing pad 18.

A somewhat different form of the invention is shown in FIGS. 6 and 7. As shown there, a clamp support 110 preferably comprises an integral casting in which the clamping bolt for the clamp is positioned above the through-bolt 40 instead of below it as in the support shown in FIGS. 1–5. The support 110 is provided with a lower rearward bearing pad portion 118 arcuately shaped for engagement with the pole and the pad is provided with a pair of pointed spurs 158, 158 adapted to be driven into the utility pole 42 to secure the support against vertical dislodgment therefrom. Immediately above the pole-engaging bearing pad 118 is a central rearward portion 114 in which are located the square aperture 132 and elongated slot 134 that serve to permit the support to be mounted on the through-bolt. The central portion 114 of the support 110 is offset a sufficient distance from the rear of the upper and lower portions (116 and 118 respectively) thereof to accommodate the square washer 28 customarily employed with the through-bolt 40.

The upper portion 116 of the clamp support 110 comprises a hollow, generally rectangular section that forms the spacer body portion of the support. The top of the rectangular portion 116 forms an upper laterally extending surface 120 which serves as the runway for the galvanized messenger strand. As before, the substantially vertically disposed face 144 of the spacer body portion serves to abut and locate the aerial cable clamp and a circular opening 146 is provided in the face of the spacer body portion that communicates with an interior, outwardly extending recess 162 formed by the hollow, spacer body portion. The laterally extending side walls 160, 160 of the spacer body portion again serve to prevent rotation of the clamping bolt once it is inserted in the recess. Similarly, laterally extending tapering side walls 164, 164 are provided adjacent the aperture 132 and slot 134 in the central portion of the support and these serve to prevent rotation of the through-bolt. Like the lower bearing pad portion 118, the upper rearward portion 117 of the support is arcuately shaped for engagement with the outer circumferential surface of the pole.

This form of clamp support is mounted on the utility pole in the same manner as the clamp support previously described. The holding nut on the through-bolt 40 is backed off sufficiently to permit the head end 38 of the through-bolt to be driven out away from the utility pole 42. The clamp support 110 is then slipped over the through-bolt 40 by first passing the enlarged aperture 132 over the head end 38 of the bolt and then dropping the support 110 until the upper edge 136 of the elongated slot 134 engages the shank of the through-bolt. The nut on the through-bolt is then tightened and the spurs 158, 158 on the lower bearing pad portion 118 of the support are driven into the pole so as to prevent vertical dislodgment of the support relative to the pole. With the clamp support thus securely attached to the pole, the aerial cable suspension clamp is turned upwardly as previously described so as to form with the laterally extending upper surface 120 of the clamp and the utility pole, a U-shaped trough into which the messenger strand may be placed before it is brought to tension. Tensioning of the messenger strand, placement of the strand in the cable clamps and the attachment of the cable to the strand then proceed as described before.

Figure 11:
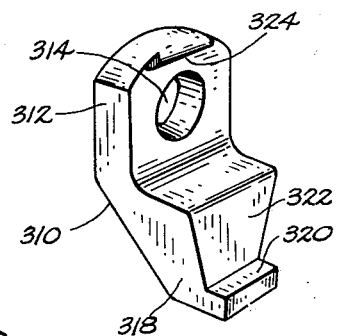
FIG. 11 is a perspective view of the locking plate shown in FIG. 10.

Additional means for preventing dislodgment of the clamp support from the pole may be provided, if desired. These means may comprise an auxiliary locking plate which serves to prevent all relative movement between the support and the through-bolt even in the event of such extensive wood shrinkage in the pole that the head end of the through-bolt no longer tightly wedges the support against the washer. Two such locking plates are shown in FIGS. 9 and 11, the locking plate shown in FIG. 9 being adapted for use with the clamp support shown in FIGS. 1–5 and the locking plate of FIG. 11 being adapted for use with the clamp support of FIGS. 6 and 7.

Figure 9:
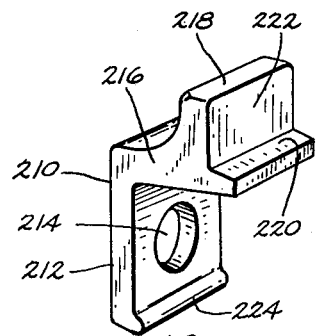
FIG. 9 is a perspective view of the locking plate shown in FIG. 8.

Referring first to FIG. 9, the locking plate shown there comprises a substantially right angular member 210. The downwardly extending wing or section 212 of the angular member is provided with a circular opening 214 to permit the mounting of the locking plate on the clamping bolt 50. The other wing or section 216 of the locking plate extends laterally inwardly toward the utility pole nd is provided at its inner end 218 with two flat surfaces 220, 222 disposed at right angles to each other. At its lower end the downwardly extending section 212 of the angular member is provided with a rounded ridge or bead 224 which bears against the face 44 of the spacer body portion 16 of the clamp support 10. As is shown in FIG. 8, the locking plate 210 is mounted on the clamping bolt 50 between the clamp (not shown) and the clamp support. By reason of the angular disposition of the wings or sections 212, 216, the plate fits over the top of the support's spacer body portion 16 and extends laterally inwardly so that the horizontally disposed surface 220 at the inner end 218 of the locking plate slips underneath the head 38 of the through-bolt 40 while the vertically disposed surface 222 abuts against the top of the bolt head 38. Tightening of the clamping nut (not shown) for the aerial cable suspension clamp causes the locking plate 210 to pivot about the bead 224 and locks the surfaces 220, 222 against the bolt head 38. All relative movement between the through-bolt and the cable clamp support is, thus, prevented and the clamp support is secured against upward movement of the through-bolt even in those instances where excessive wood shrinkage in the pole results in a loose fit of the upper bearing pad portion between the through-bolt and the pole.

Figure 10:
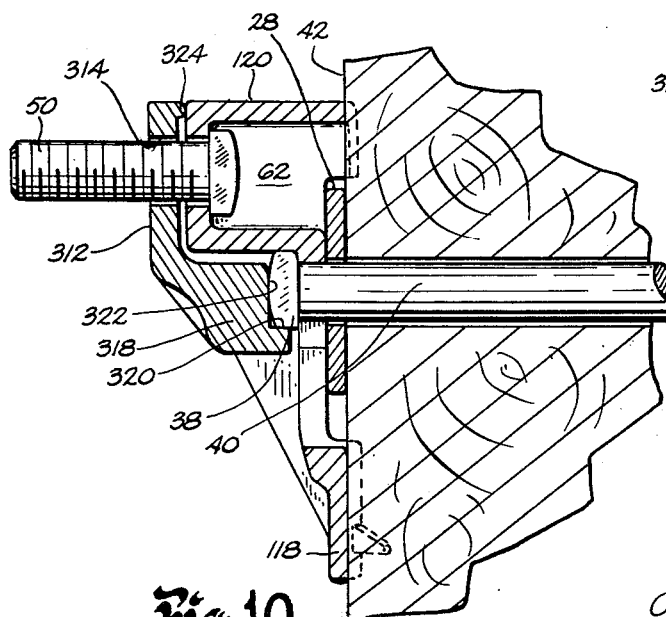
FIG. 10 is a view similar to that of FIG. 8 illustrating the manner of applying a locking plate to the support shown in FIGS. 6 and 7.

A similar locking plate is provided for the clamp support shown in FIGS. 6 and 7 and its installation on the clamp support is shown in FIG. 10. This locking plate 310 is similar to that of FIG. 9 except that it is adapted to extend downwardly from the clamping bolt instead of upwardly. As before, the inwardly extending end 316 of the locking plate is provided with two flat surfaces 320, 322 at substantially right angles to each other, one being substantially horizontally disposed and the other being substantially vertically disposed. An opening 314 is provided in the upwardly extending portion 312 of the locking plate so as to enable the locking plate to fit over the clamping bolt and a bead 324 is formed at the upper end of the locking plate to serve as a fulcrum for the locking plate. When the nut (not shown) on the clamping bolt is tightened, the two flat surfaces 320, 322 on the end 318 of the locking plate abut against and lie underneath the head end 38 of the through-bolt 40, thereby locking the support to the bolt and preventing upward dislodgment of the clamp relative to the pole.

The foregoing descriptions of two particular forms of the invention have been set forth for purposes of illustration only in order to instruct the art how the present invention may be practiced. Those skilled in the art will appreciate that the applicant's invention may be embodied in still different forms. The specific examples shown and described herein do not, therefore, define or restrict the scope of the invention. For this purpose, applicant relies upon the claim appended hereto.

What is claimed is:

A clamp support for attaching an aerial cable clamp to a utility pole having a pre-existing cable clamp installation at one side of the pole in which a through-bolt is passed through the pole, said clamp support comprising a substantially vertically disposed upper and rearward portion formed with an opening therein shaped to form an enlarged aperture with a narrower elongated slot at the upper side thereof whereby said clamp support may be slidably dropped over the head end of the said through-bolt and securely clamped against the pole upon the tightening of said through-bolt, said rearward portion having a pair of parallel guard walls adjacent the elongated slot and disposed on opposite sides thereof, said guard walls being so spaced as to prevent the head of the through-bolt from turning during the tightening of the bolt, a substantially vertically disposed forward portion laterally displaced from said rearward portion and formed with an opening therein, said forward and rearward portions being joined by webs parallelly disposed adjacent said last-mentioned opening, a short clamping bolt in said last-mentioned opening for joining a clamp to said support, said clamping bolt having a head end which lies between the webs joining the forward and rearward portion the webs being so spaced as to prevent the head of the clamping bolt from turning during the tightening of the bolt, said clamping bolt having a threaded end which extends outwardly through the last-mentioned opening in the forward portion to receive a cable clamp, a lower rearward pole-engaging portion joined to said forward portion, said pole-engaging portion being provided with means for resisting upward displacement of the support relative to the pole, and locking means for preventing the support from slipping upwardly off the through-bolt on the utility pole, said locking means comprising a locking plate formed to fit on the clamping bolt and having one part bearing against said vertically disposed upper and rearward portion and another part extending underneath the head end of the through-bolt.

References Cited in the file of this patent

UNITED STATES PATENTS

| | | |
|---|---|---|
| 482,086 | Gridley | Sept. 6, 1892 |
| 1,442,159 | Kugler | Jan. 16, 1923 |
| 1,754,929 | Williams | Apr. 15, 1930 |
| 2,901,798 | Jenne | Sept. 1, 1959 |